United States Patent [19]

Colin

[11] Patent Number: 4,542,626

[45] Date of Patent: Sep. 24, 1985

[54] METHOD AND APPARATUS FOR UNDERGROUND STORAGE OF AMMONIA AND ANALOGOUS PRODUCTS

[75] Inventor: Pierre Colin, Chavilly Larue, France

[73] Assignee: Societe Francaise de Stockage Geologique GEOSTOCK, France

[21] Appl. No.: 604,289

[22] Filed: Mar. 26, 1984

[30] Foreign Application Priority Data

Apr. 26, 1983 [FR] France .................. 83 06822

[51] Int. Cl.[4] .............................................. F17C 1/00
[52] U.S. Cl. .......................................... 62/45; 62/260; 137/363; 165/45; 405/53
[58] Field of Search ................... 137/363; 62/45, 260; 165/45; 405/53, 55

[56] References Cited

U.S. PATENT DOCUMENTS

| | | | |
|---|---|---|---|
| 3,205,665 | 9/1965 | Van Horn | 62/45 |
| 3,505,821 | 4/1970 | Scisson et al. | 405/53 |
| 3,530,674 | 9/1970 | Cobbs et al. | 405/53 |
| 3,986,339 | 10/1976 | Janelid | 62/45 |
| 3,990,248 | 11/1976 | Calminder | 62/45 |
| 4,121,429 | 10/1978 | Grennard | 62/45 |
| 4,425,743 | 1/1984 | Bartur | 403/53 |

Primary Examiner—Ronald C. Capossela
Attorney, Agent, or Firm—Sughrue, Mion, Zinn, Macpeak and Seas

[57] ABSTRACT

When a product such as ammonia, which is liquefiable under pressure and which is miscible with water is stored underground the storage takes place at the liquefaction pressure of the product and inside a double skin which defines an intermediate space (10), with both skins being inserted in a cavity (1) formed in a water-impregnated formation. The depth of the storage is so chosen that the hydrostatic pressure of the water in the formation is greater than the greatest expected pressure of the stored product, with the intermediate space being filled with water and being maintained at a pressure which is lower than the lowest expected pressure of the stored product. If the inner skin is punctured, $NH_3$ is recovered in the water in the shaft (2) and does not escape to contaminate the water in the surrounding formation.

10 Claims, 3 Drawing Figures

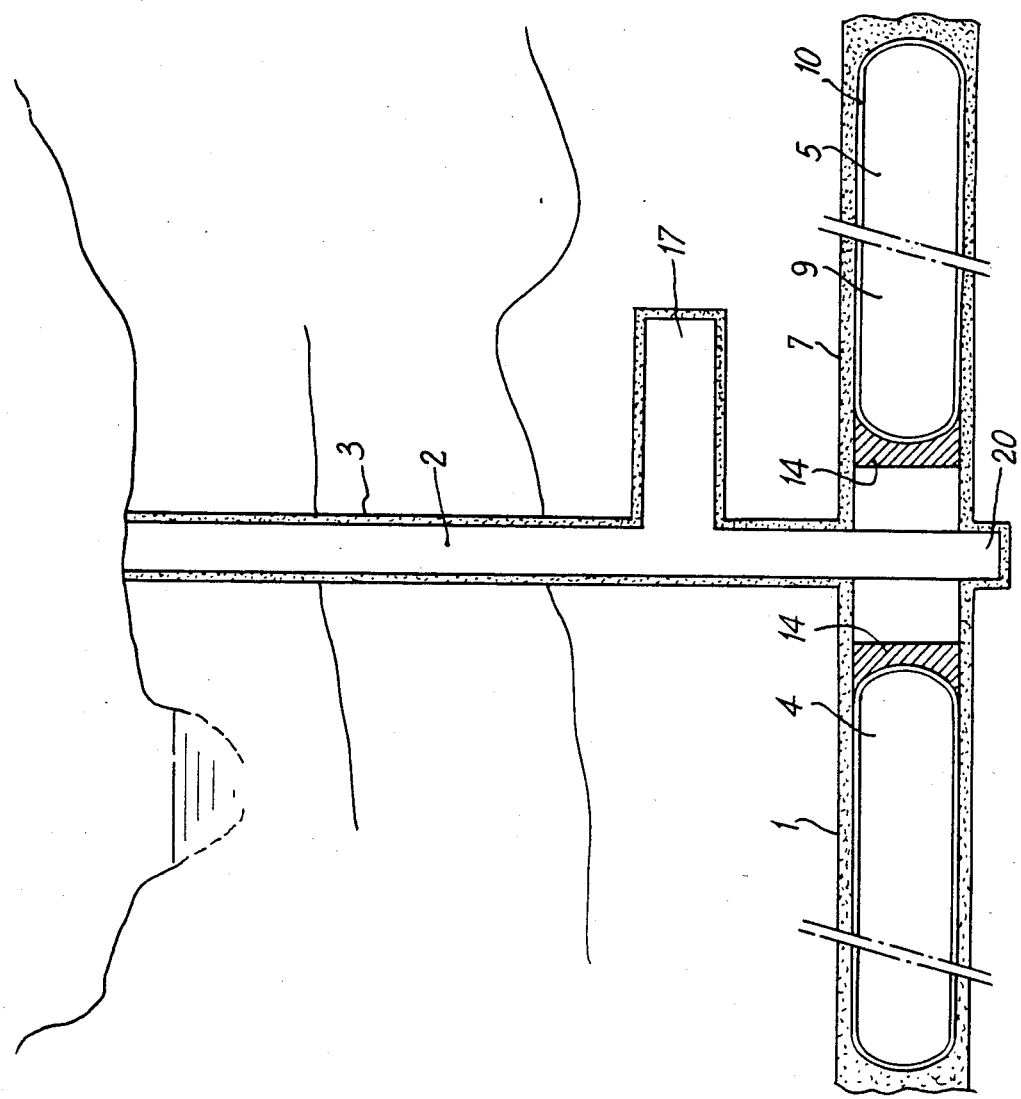

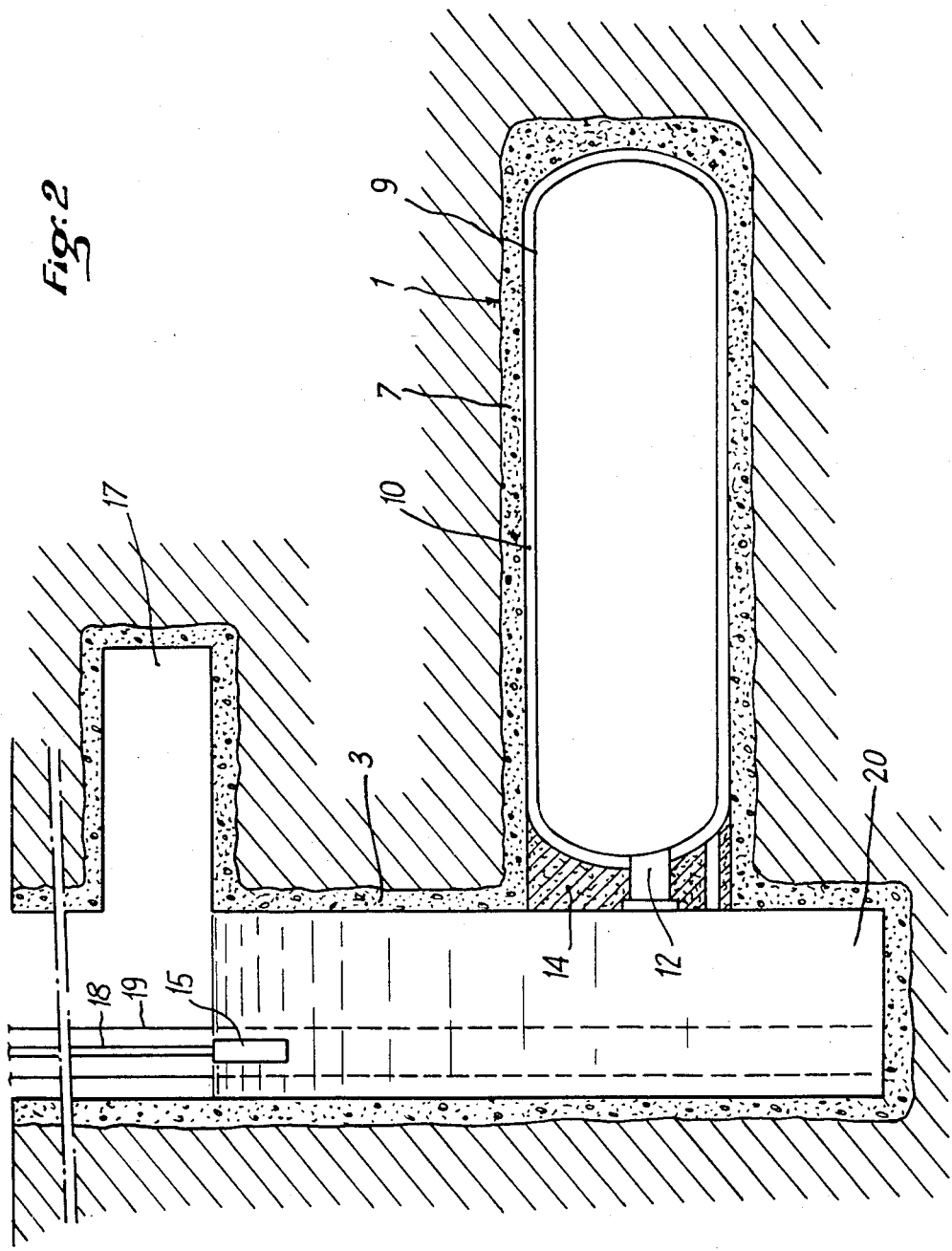

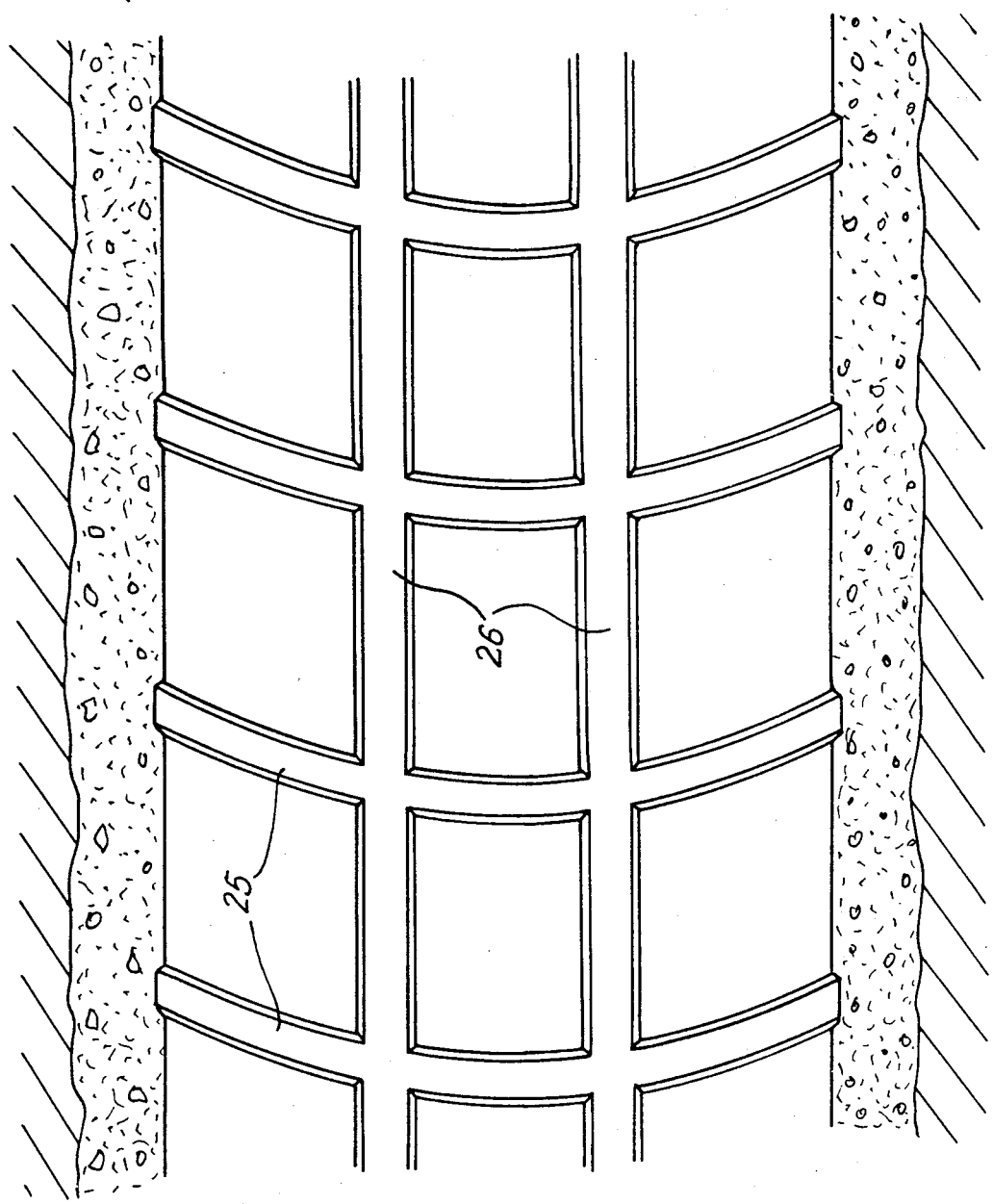

METHOD AND APPARATUS FOR UNDERGROUND STORAGE OF AMMONIA AND ANALOGOUS PRODUCTS

The present invention relates to a method and to apparatus for storing liquefied ammonia, or analogous products, at ambient temperature.

BACKGROUND OF THE INVENTION

Underground storage is safer than storage in spheres on the surface, both with respect to vulnerability to acts of sabotage or aircraft crashes and also with respect to protecting the air and the water-bearing environment in the event of a breakage. The basic design consists in digging underground cavities in rock, and in sealing the storage volume by means of a waterproof membrane.

Numerous underground storage installations exist for petroleum products such as gasoline, diesel oil, heating oil, and liquefied gases such as butane or propane. These products are immiscible with water. If any water does flow into the mass of stored product, it does not mix with the product, but rather it collects in the bottom of the cavity. This is no great handicap and frequently takes place in many storage installations. However, when the stored product is ammonia, the presence of water reduces the concentration of the ammonia which becomes unuseable even with very small quantities of water (a few percent).

Thus with petroleum products it is common practice to provide storage installations in which the surrounding water pressure is greater than the pressure of the product in the cavity. The water which flows into the cavity is easily pumped out from a sump in the cavity, and there is no risk of the petroleum product escaping into the surrounding formations. With ammonia or the like, the conditions are quite different.

Ammonia ($NH_3$) boils at $-33.4°$ C. at atmospheric pressure. It can thus be stored under such conditions. However, such cryogenic storage is very expensive to set up and has increased running and maintenance costs compared with pressurized storage. Ammonia is easily liquefied under pressure, with the following boiling points at various pressures:

$+2°$ C. at 4 bars; $15°$ C. at 6 bars; $23°$ C. at 8 bars. An underground gallery at a depth of several tens of meters is at a temperature of about $15°$ C., and the present invention envisages storage taking place under such conditions. Clearly the temperature may depart temporarily from this value, eg. immediately after storing ammonia at some other temperature. However, in order to avoid running the risk of freezing water in the surrounding formations, ammonia must not be stored at a temperature of $0°$ C. or less since the resulting deformation could damage the installation.

Given these characteristics of ammonia, together with its chemical properties, in particular in relation to water, a storage installation designed for ammonia must cope with two problems:

(1) the stored ammonia must be completely confined in the storage volume, ie. there must be not outward leaks (to the atmosphere or to the water in surrounding formations); and (2) any water in the surrounding formation (whether from the water table or from intermittent infiltration through unsaturated rock) must not be able to penetrate the storage volume in quantities which could degrade the product.

The design of the storage installation must take account of both criteria for liquid-tightness, and these criteria must continue to be satisfied for the life of the installation. The design may be based on interposing a completely impermeable membrane between the product and the surrounding medium. The membrane must be strong enough to withstand the internal pressure of the stored ammonia even in the event of changes in shape or size (eg. due to a change in the temperature of the stored product, or to a crack in the encasing concrete). The membrane must also withstand internal corrosion from the product and external corrosion from the surrounding medium (water).

Advantageously, the impermeable membrane (or envelope) is made of metal. As a general rule, most metals and their alloys are essentially inert with respect to ammonia and are not subject to generalized corrosion therefrom. However, copper and zinc and their alloys must not be used, particularly in the presence of water. Finally, oxygen and nitrogen, and in more general terms air, can lead to a corrosion phenomenon of construction steels under stress. Adding a small amount of water (0.2% by weight according to legislation currently in force in the USA) to the ammonia appears to eliminate this risk. In conclusion, the use of mild steel is recommended, provided the welding is properly done and provided that $2°/oo$ of water may be added to the product.

In the method described in the present assignee's published French patent specification No. 2 380 200 dated 8th Mar. 1977, water is maintained around the envelope at a higher pressure than the internal pressure. Contamination of underground water is thus avoided, but the possibility of contaminating the stored product is not avoided, supposing that a leak were to appear in the envelope.

Preferred implementations of the present invention provide a method and apparatus in which there is no danger of contamination, and in which any leak through the envelope can be detected immediately. The method and the apparatus of the present invention are described below in relation to ammonia, but it will be understood that they are applicable to storing products having analogous or related characteristics.

SUMMARY OF THE INVENTION

The present invention provides a method of storing underground a product, such as ammonia, which is liquefiable under pressure and which is miscible with water, wherein the storage takes place at the liquefaction pressure of the product inside a double skin which defines an intermediate space, both skins being inserted in a cavity formed in a water-impregnated formation, the depth of the storage being so chosen that the hydrostatic pressure of the water in the formation is greater than the greatest expected pressure of the stored product, with the intermediate space being filled with water and being maintained at a pressure which is lower than the lowest expected pressure of the stored product.

Advantageously the inner skin or envelope is made of mild steel, and is protected against external corrosion by an electrolytic installation.

The invention also provides apparatus for performing the above method.

BRIEF DESCRIPTION OF THE DRAWINGS

An embodiment of the invention is described by way of example with reference to the accompanying drawings, in which:

FIG. 1 is a section through a storage installation in accordance with the invention;

FIG. 2 is a view on a larger scale of a portion FIG. 1; and

FIG. 3 is a section on a vertical axial plane through a concreted cavity, without the impermeable envelope, showing the grid of channels which form the annular drainage space.

MORE DETAILED DESCRIPTION

FIG. 1 is a section through a storage site including a water course and a storage volume which has been obtained by digging out a gallery 1 leading from a shaft 2. Access to the underground installation is via the vertical shaft 2. The excavated cavity 1 and the shaft are cased in concrete 3, 7 with the casing 3 in the shaft being intended to maintain stability during excavation and over the long term, and with the casing 7 in the cavity being intended to provide a suitable surface for receiving the steel lining. The internal pressure of the storage volume is thus applied against the concrete and hence against rock. After excavation is completed, the gallery is entirely covered in a ring of non-reinforced concrete. It may be about 50 cm thick. Sealing material may be provided in conventional manner to allow for shrinkage cracks. As shown in FIG. 1, a gallery 1 may contain two storage tanks 4 and 5, one on either side of the shaft 2. The relative dimensions shown in FIG. 1 are by way of example only, and the invention is not limited thereto.

Each storage tank is lodged in the gallery 1 after its walls have been cased with permeable concrete 7 (see FIG. 2). Sealing is provided by a lining of welded sheet steel 9 which covers the entire concrete wall. The sheet may be protected against corrosion by the stored product on its inside and against corrosion by the surrounding medium on its outside by means such as cathode protection. Naturally, in the context of the present invention, it is possible to use a non-metallic envelope, eg. an envelope made of a plastic material or rubber.

An annular space 10 is left between the steel lining and the ground to serve as a drain. This space is permanently maintained at a pressure which is lower than the hydrostatic pressure and which lower than the pressure of the product. Water is thus prevented form penetrating into the storage tank, and a continuous check can be kept on the absence of the product leaking into the annular space. In the unlikely event of such a leak occurring, the product can still be recovered from the annular space without polluting the surrounding underground water. The details of the basic design include the possibility of providing access to the storage tank, ie. means are provided to completely pump out the annular space 10, and a man-hole 12 is provided through a concrete plug 14. The pumping out pump 15 is of sufficient capacity to be able to permanently extract the entire quantity of water that may seep in from the surrounding formations. The concrete casing may have the beneficial role of greatly reducing the seepage rate, but, the permeable characteristics of the concrete cannot be guaranteed under storage conditions for the entire life of the installation, so the pump must be capable of pumping out the entire residual flow rate of water into the gallery as it was after initial excavation and subsequent leak plugging, but before the concrete casing was put in place.

Account must also be taken of the possibility of the pump breaking down. In such a case there is a risk that the pressure in ths annular space will tend towards the hydrostatic pressure and thus exceed the crushing pressure of the steel lining. To avoid this danger, a buffer volume is used to collect the seepage water over the time that will be required to repair the pump. This buffer volume may be constituted by the volume of the shaft above the permanent pumping out level, or it may be constituted by the beginning of a gallery 17 situated above the storage tank. The particular solution chosen will depend on the specific hydrological nature of the formation in which the storage installation is built and on the effectiveness of leak plugging during construction. In other words the solution depends on the maximum possible rate at which water may need to be pumped out. It is assumed in this description that the storage tanks are located at a depth such that the hydrostatic pressure in the surrounding formations is permanently higher than the pressure in the storage tank. So long as the underground water is replaced at an adequate rate, this provides natural hydraulic sealing which will prevent any of the product from escaping into the formation.

Since the impermeable envelope bears against the concrete, the annular space is advantageously constituted by a grid of channels (see FIG. 3). For example, circumferential and longitudinal grooves 25 and 26 which are 5 cm wide and 1 cm deep could be provided in the inside, or envelope-receiving, surface of the concrete casing at a spacing of 1 m. The annular space would be constituted by the grid of grooves.

If the envelope is made of welded steel sheet, the circumferential channels 25 could be opposite the welds. In a variant, the longitudinal grooves 26 could be omitted by connecting each circumferential channel 25 to a corresponding pumping out tube. This would require a large number of tubes, but in the event of a leak its location could immediately be determined. Leaks are most likely to occur at the welds, so any specific tube evacuating the stored product would indicate exactly with weld was leaking, while a pair of adjacent tubes evacuating a mixture of water and product would indicate the location of a leak to within a meter, which is still of great help in performing repairs.

The pump is suspended from its outlet tube 18. It may be raised or lowered to a desired level, for example if it is necessary to empty the shaft down to its sump 20.

By way of example, for stocking ammonia at 15° C. the equilibrium pressure is 6 bars, so a depth should be chosen where the hydrostatic pressure is 9 bars, and a pressure of 2 bars should be maintained in the annular space. The base of the buffer volume 17 should then be about 10 meters above the ceiling of the storage gallery 1.

In a variant, a second annular space could be provided between the surrounding ground formations and the concrete casing. This second annular space would serve to reduce the rate at which ground water flows towards the ammonia in the even that the steel skin is ruptured. An installation could then continue to operated for a period of time before repairs become imperative, eg. until the next annual holiday. The second annular space may be constituted by conventional drainage sheathing placed in the ground before casting the concrete. The sheathing is connected to apparatus similar to that connected to the inner annular space in order to maintain the pressure therein at a value between the hydrostatic pressure and the storage pressure, eg. 7 bars for a storage pressure of 6 bars and a hydrostatic pressure of 9 bars.

In the example shown, the height of the storage tanks (8 meters) sets up a non-negligible pressure difference between the top and the bottom of the storage tank. So long as no new product is inserted, the storage pressure stabilizes to the value corresponding to ambient temperature (15° C. and 6 bars for ammonia), but if a large quantity of product at a different temperature is inserted the pressure may vary somewhat.

The spherical end portion of the steel lining is made of very thick steel (eg. 14 mm) as are the last two meters of the cylindrical portion of the tank so as to enable the various holes to be made (not shown) that are needed for inserting and removing the product and for measuring its condition. This thicker steel also enable the manhole to be provided. In operation the end of the tank has a force of about 4000 tons acting on it due to the internal pressure of the ammonia. This is resisted by a plug of steel reinforced concrete 14 which bears against the spherical end of the tank.

The example shown has two tanks. This arrangement enables one tank to be filled while the other is being destocked. Additional tanks could be provided, for example in the well-known star formation around the shaft or in a comb-toothed formation, depending on the expected activity and the nature of the terrain. It is always possible to completely empty one of the tanks for inspection and/or repair, provided the shaft is pumped out to the level of the sump 20. It such circumstances, it is necessary to provide a water curtain in order to ensure continuity of the hydrostatic pressure around the shaft.

Various conventional accessories such as pipework, valves, level and other detectors etc., have not been shown since they have no direct bearing on the present invention. Clearly they must be provided for a working installation.

Numerous modifications may be made to the specific example which has been shown and described without going beyond the scope of the invention.

I claim:

1. A method of storing underground a product, such as ammonia, which is liquefiable under pressure and which is miscible with water, said method comprising the steps of:
    forming a double skin storage container within a cavity in a water-impregnated underground formation, at a depth such that the hydrostatic pressure of the water in the underground formation is greater than the pressure of storage of the product as a liquid, with said double skins spaced to define an intermediate space, said double skin container comprising an outer skin permeable to water and an inner skin impervious to water,
    supplying said product to said container under pressure such that said product is liquid under storage,
    filling said intermediate space with water, and
    maintaining said water within said intermediate space at a pressure which is lower than the lowest expected pressure of the stored product;
    whereby, since the underground formation is at a hydrostatic pressure which is greater than the pressure of storage, water may pass from the formation through the outer skin into the intermediate space, thereby preventing the stored product from leaking into the surrounding formation, and wherein since the water within the intermediate space is at a pressure less than that of the liquified product within the inner skin, any product leakage is through the inner skin into the intermediate space.

2. A method according to claim 1, further comprising the step of maintaining the pressure constant in the intermediate space by communicating the intermediate space to a vertical shaft leading to the surface of the formation and maintaining the water level constant within said shaft.

3. A method according to claim 2, further comprising the step of pumping water periodically from the shaft to examine the water for traces of the stored product, thereby evidencing a leak of the product through the first skin of the double skin container.

4. A method according to claim 1, wherein said product is ammonia, and wherein said ammonia is stored at a pressure of about 6 bars, the hydrostatic pressure of the surrounding formation is selected to be about 9 bars and the pressure of the intermediate space is maintained at about 2 bars.

5. Apparatus for storing a product such as ammonia which is liquefiable under pressure underground and which is miscible with water, said apparatus comprises:
    a gallery within a water impregnated formation, the depth of said gallery being selected such that the hydrostatic pressure of the water in the formation is greater than the greatest expected pressure of the stored product,
    said gallery comprising an outer skin permeable to water, an inner skin spaced from said outer skin and being impervious to water, said skins forming an intermediate space, and
    means for maintaining the pressure in the intermediate space at a lower pressure than the storage pressure, and
    means for supplying said product as a liquid under pressure to interior of the inner skin;
    whereby, water under pressure seeps through said impervious outer skin into the intermediate space and is maintained at a lower pressure than the product within said inner skin, whereby the stored product is prevented from leaking into the surrounding water-impregnated formation, and wherein any leakage through the inner skin permits the stored product to leak to the intermediate space, but not vice versa.

6. Apparatus according to claim 5, wherein the inner, skin is made of steel sheet.

7. Apparatus according to claim 5, wherein said outer skin is concrete.

8. Apparatus according to claim 5, wherein the intermediate space is constituted by channels formed in the inside wall of the outer skin.

9. Apparatus according to claim 5, further comprising a vertical shaft extending upwardly from said gallery through said water-impregnated formation, and means are provided for connecting said shaft to said intermediate space, and said apparatus includes means for maintaining a constant water level in said shaft above said intermediate space.

10. Apparatus according to claim 9, further comprising a buffer volume opening to said shaft and situated at a height above the storage tank such that the hydrostatic pressure set up by the water in the shaft between the buffer volume and the storage tank corresponds to the hydrostatic pressure of the intermediate volume.

* * * * *